(12) United States Patent
Kamperman (10) Patent No.: US 9,436,809 B2
(45) Date of Patent: *Sep. 6, 2016

(54) SECURE AUTHENTICATED DISTANCE MEASUREMENT

(71) Applicant: KONINKLIJKE PHILIPS N.V., Eindhoven (NL)

(72) Inventor: Franciscus Lucas Antonius Johannes Kamperman, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,493

(22) Filed: Nov. 11, 2014

(65) Prior Publication Data

US 2015/0074822 A1    Mar. 12, 2015

Related U.S. Application Data

(63) Continuation of application No. 10/521,858, filed as application No. PCT/IB03/02932 on Jun. 27, 2003, now Pat. No. 8,886,939.

(30) Foreign Application Priority Data

Jul. 26, 2002    (EP) .................................... 02078076

(51) Int. Cl.
*G06F 21/10*        (2013.01)
*H04L 29/06*        (2006.01)
(Continued)

(52) U.S. Cl.
CPC .............. *G06F 21/10* (2013.01); *H04L 63/107* (2013.01); *G06F 2221/07* (2013.01); *G06F 2221/2111* (2013.01); *H04L 2463/101* (2013.01); *H04W 12/06* (2013.01); *H04W 24/00* (2013.01)

(58) Field of Classification Search
CPC .............................. G06F 21/10; H04L 63/107
See application file for complete search history.

(56) References Cited

U.S. PATENT DOCUMENTS 4,438,824 A    3/1984    Mueller-Schloer
4,688,036 A    8/1987    Hirano et al.
(Continued)

FOREIGN PATENT DOCUMENTS

JP    9170364 A    0/6199
JP    H04306760 A    10/1992
(Continued)

OTHER PUBLICATIONS

Stefan Brands and Devid Chaum, "Distance-Bounding Protocols", Eurocrypt '93 (1993), pp. 344-359.
(Continued)

*Primary Examiner* — Darren B Schwartz (57) ABSTRACT

The invention relates to a method for a first communication device to perform authenticated distance measurement between the first communication device and a second communication device, wherein the first and the second communication device share a common secret and the common secret is used for performing the distance measurement between the first and the second communication device. The invention also relates to a method of determining whether data stored on a first communication device are to be accessed by a second communication device. Moreover, the invention relates to a communication device for performing authenticated distance measurement to a second communication device. The invention also relates to an apparatus for playing back multimedia content comprising a communication device.

60 Claims, 3 Drawing Sheets

(51) Int. Cl.
*H04W 12/06* (2009.01)
*H04W 24/00* (2009.01)

(56) References Cited

U.S. PATENT DOCUMENTS

| | | | |
|---|---|---|---|
| 5,126,746 A | 6/1992 | Gritton | |
| 5,596,641 A | 1/1997 | Ohashi et al. | |
| 5,602,917 A | 2/1997 | Mueller | |
| 5,659,617 A * | 8/1997 | Fischer | H04L 9/3271 380/258 |
| 5,723,911 A | 3/1998 | Glehr | |
| 5,778,071 A | 7/1998 | Caputo et al. | |
| 5,937,065 A | 8/1999 | Simon et al. | |
| 5,949,877 A | 9/1999 | Traw et al. | |
| 5,983,347 A | 11/1999 | Brinkmeyer et al. | |
| 6,085,320 A | 7/2000 | Kaliski, Jr. | |
| 6,088,450 A | 7/2000 | Davis et al. | |
| 6,151,676 A | 11/2000 | Cuccia et al. | |
| 6,208,239 B1 | 3/2001 | Muller et al. | |
| 6,346,878 B1 | 2/2002 | Pohlman et al. | |
| 6,351,235 B1 | 2/2002 | Stilp | |
| 6,442,690 B1 * | 8/2002 | Howard, Jr. | G06F 21/602 713/156 |
| 6,484,948 B1 | 11/2002 | Sonoda | |
| 6,493,825 B1 | 12/2002 | Blumenau et al. | |
| 6,526,509 B1 * | 2/2003 | Horn | H04L 9/3263 380/277 |
| 6,550,011 B1 * | 4/2003 | Sims, III | G06F 21/10 365/52 |
| 7,200,233 B1 | 4/2007 | Keller et al. | |
| 8,107,627 B2 | 1/2012 | Epstein | |
| 8,352,582 B2 | 1/2013 | Epstein | |
| 8,997,243 B2 | 3/2015 | Epstein | |
| 2001/0008558 A1 | 7/2001 | Hirafuji | |
| 2001/0043702 A1 | 11/2001 | Elteto et al. | |
| 2001/0044786 A1 | 11/2001 | Ishibashi | |
| 2001/0050990 A1 * | 12/2001 | Sudia | G06Q 20/02 380/286 |
| 2002/0007452 A1 | 1/2002 | Traw et al. | |
| 2002/0026424 A1 | 2/2002 | Akashi | |
| 2002/0026576 A1 | 2/2002 | Das-Purkayastha et al. | |
| 2002/0035690 A1 | 3/2002 | Nakano | |
| 2002/0061748 A1 | 5/2002 | Nakakita et al. | |
| 2002/0078227 A1 | 6/2002 | Kronenberg | |
| 2002/0166047 A1 * | 11/2002 | Kawamoto | H04L 9/3263 713/169 |
| 2003/0021418 A1 | 1/2003 | Arakawa et al. | |
| 2003/0030542 A1 | 2/2003 | von Hoffmann | |
| 2003/0051151 A1 * | 3/2003 | Asano | G11B 20/00086 713/193 |
| 2003/0065918 A1 | 4/2003 | Willey | |
| 2003/0070092 A1 | 4/2003 | Hawkes et al. | |
| 2003/0112978 A1 | 6/2003 | Rodman et al. | |
| 2003/0184431 A1 | 10/2003 | Lundkvist | |
| 2003/0220765 A1 | 11/2003 | Overy et al. | |
| 2004/0015693 A1 | 1/2004 | Kitazumi | |
| 2004/0080426 A1 * | 4/2004 | Fraenkel | H04W 8/245 340/9.14 |
| 2005/0114647 A1 | 5/2005 | Epstein | |
| 2005/0265503 A1 | 12/2005 | Rofheart et al. | |
| 2006/0294362 A1 | 12/2006 | Epstein | |

FOREIGN PATENT DOCUMENTS

| | | |
|---|---|---|
| JP | H0619948 A | 1/1994 |
| JP | H08234658 A | 9/1996 |
| JP | H09170364 A | 6/1997 |
| JP | 11101035 A | 4/1999 |
| JP | 11208419 A | 8/1999 |
| JP | 2000357156 A | 12/2000 |
| JP | 2001249899 A | 9/2001 |
| JP | 2001257672 A | 9/2001 |
| JP | 2002124960 A | 4/2002 |
| JP | 2002189966 A | 7/2002 |
| WO | 9739553 A1 | 10/1997 |
| WO | 9949378 | 9/1999 |
| WO | 0152234 A1 | 7/2001 |
| WO | 0193434 A2 | 12/2001 |
| WO | 0233887 A2 | 4/2002 |
| WO | 0235036 A1 | 5/2002 |

OTHER PUBLICATIONS

Tim Kindber & Kan Zhang, "Context Authentication Using Constrained Channels", pp. 1-8.

Hitachi, Ltd, "5C Digital Transmission Content Protection White Paper", Rev. 1.0, July 14, 1998, pp. 1013.

Boyd et al, "Protocols for Authentication and Key Establishment", Spring-Verlag, September 17, 2003, pp. 116-120, 195-195, 305.

Modern Cryptography Theory (1986) Chapter 9, ISBN: 4-88552-064-9 (Japanese).

Hayashi et al, Encryption and Authentication Program Module, Technical Paper (Japanese) NTT R&D vol. 44 No. 10 Oct. 1, 1995.

Ikeno et al. "Modern Cryptography Theory" Japan, Institute of Electronics, Information and Communication Engineersm Nov. 15, 1997, p. 175-177.

* cited by examiner

SECURE AUTHENTICATED DISTANCE MEASUREMENT

This application claims, pursuant to 35 USC 120, priority to and the benefit of the earlier filing date of, that patent application entitled "Secure Authenticated Distance Measurement", filed on Jan. 21, 2005 and afforded Ser. No. 10/521,858 (now U.S. Pat. No. 8,886,939), which claimed priority to and the benefit of the earlier filing date, as a National Stage Filing of that international patent application filed on Jun. 27, 2003 and afforded serial number PCT/IB03/02932 (WO2004014037), which claimed priority to and the benefit of the earlier filing date of that patent application filed on Jul. 26, 2002 and afforded serial number EP02078076.3, the contents of all of which are incorporated by reference, herein.

This application is further related to that patent application entitled "Secure authenticated Distance Measurement", filed on Jul. 24, 2009 and afforded Ser. No. 12/508,917 (now U.S. Pat. No. 8,543,819), issued Sep. 24, 2013), which claimed priority to and the benefit of the earlier filing date of that patent application entitled "Secure Authenticated Distance Measurement", filed on Jan. 21, 2005 and afforded Ser. No. 10/521,858 (now U.S. Pat. No. 8,886,939), the contents of which are incorporated by reference herein.

The invention relates to a method for a first communication device to perform authenticated distance measurement between a first communication device and a second communication device. The invention also relates to a method of determining whether data stored on a first communication device is to be accessed by a second communication device. Moreover, the invention relates to a communication device for performing authenticated distance measurement to a second communication device. The invention also relates to an apparatus for playing back multimedia content comprising a communication device.

Digital media have become popular carriers for various types of data information. Computer software and audio information, for instance, are widely available on optical compact disks (CDs) and recently also on digital video/versatile discs (DVDs) which have been gaining in distribution share. The CD and the DVD utilize a common standard for the digital recording of data, software, images, audio and multimedia. Additional media, such as recordable discs, solid-state memory, and the like, are making considerable gains in the software and data distribution market.

The substantially superior quality of the digital format as compared to the analog format renders the former substantially more prone to unauthorized copying and pirating, further a digital format is both easier and faster to copy. Copying of a digital data stream, whether compressed, uncompressed, encrypted or non-encrypted, typically does not lead to any appreciable loss of quality in the data. Digital copying thus is essentially unlimited in terms of multi-generation copying. Analog data with its signal to noise ratio loss with every sequential copy, on the other hand, is naturally limited in terms of multi-generation and mass copying.

The advent of the recent popularity in the digital format has also brought about a slew of copy protection and digital rights management (DRM) systems and methods. These systems and methods use technologies such as encryption, watermarking and right descriptions (e.g. rules for accessing and copying data).

One way of protecting content in the form of digital data is to ensure that content will only be transferred between devices if:

the receiving device has been authenticated as being a compliant device, and the user of the content has the right to transfer (move, copy) that content to another device.

If transfer of content is allowed, this will typically be performed in an encrypted way to make sure that the content cannot be captured illegally in a useful format.

Technology to perform device authentication and encrypted content transfer is available and is called a secure authenticated channel (SAC). Although it might be allowed to make copies of content over a SAC, the content industry is very bullish on content distribution over the Internet. This results in disagreement of the content industry on transferring content over interfaces that match well with the Internet, e.g. Ethernet.

Further, it should be possible for a user visiting his neighbor to watch a movie, which he owns, on the neighbor's big television screen. Typically, the content owner will disallow this, but it might become acceptable if it can be proved that a license holder of that movie (or a device that the license holder owns) is near that television screen.

It is therefore of interest to be able to include an authenticated distance measurement when deciding whether content should be accessed or copied by other devices.

In the article by Stefan Brands and David Chaum, "Distance-Bounding protocols", Eurocrypt '93 (1993), Pages 344-359, integration of distance-bounding protocols with public-key identification schemes is described. Here distance measurement is described based on time measurement using challenge and response bits and with the use of a commitment protocol. This does not allow authenticated device compliancy testing and is not efficient when two devices must also authenticate each other.

It is an object of the invention to obtain a solution to the problem of performing a secure transfer of content within a limited distance.

This is obtained by a method for a first communication device to performing authenticated distance measurement between the first communication device and a second communication device, wherein the first and the second communication device share a common secret and the common secret is used for performing the distance measurement between the first and the second communication device.

Because the common secret is being used for performing the distance measurement, it can be ensured that when measuring the distance from the first communication device to the second communication device, it is the distance between the right devices that is being measured.

The method combines a distance measurement protocol with an authentication protocol. This enables authenticated device compliancy testing and is efficient, because a secure channel is anyhow needed to enable secure communication between devices and a device can first be tested on compliancy before a distance measurement is executed.

In a specific embodiment, the authenticated distance measurement is performed according to the following steps;

transmitting a first signal from the first communication device to the second communication device at a first time t1, the second communication device being adapted for receiving the first signal, generating a second signal by modifying the received first signal according to the common secret and transmitting the second signal to the first device, receiving the second signal at a second time t2, checking if the second signal has been modified according to the common secret, and determining the distance between the first and the second communication device according to a time difference between t1 and t2.

When measuring a distance by measuring the time difference between transmitting and receiving a signal and using a secret, shared between the first and the second communication device, for determining whether the returned signal really originated from the second communication device, the distance is measured in a secure authenticated way ensuring that the distance will not be measured to a third communication device (not knowing the secret). Using the shared secret for modifying the signal is a simple way to perform a secure authenticated distance measurement.

In a specific embodiment, the first signal is a spread spectrum signal. Thereby a high resolution is obtained and it is possible to cope with bad transmission conditions (e.g. wireless environments with a lot of reflections).

In another embodiment the step of checking if the second signal has been modified according to the common secret is performed by the steps of:
generating a third signal by modifying the first signal according to the common secret, and
comparing the third signal with the received second signal.

This method is an easy and simple way of performing the check, but it requires that both the first communication device and the second communication device know how the first signal is being modified using the common secret.

In a specific embodiment the first signal and the common secret are bit words and the second signal comprises information being generated by performing an exclusive OR operation (XOR) between the bit words. Thereby, it is a very simple operation that has to be performed, resulting in demand for few resources by both the first and the second communication device when performing the operation.

In an embodiment, the common secret has been shared before performing the distance measurement, the sharing being performed by the steps of:
performing an authentication check from the first communication device on the second communication device by checking whether the second communication device is compliant with a set of predefined compliance rules, and
if the second communication device is compliant, sharing the common secret by transmitting the secret to the second communication device.

This is a secure way of performing the sharing of the secret, ensuring that only devices being compliant with compliance rules can receive the secret. Further, the shared secret can afterwards be used for generating a SAC channel between the two devices. The secret could be shared using e.g. key transport mechanisms as described in ISO 11770-3. Alternatively, a key agreement protocol could be used, which e.g. is also described in ISO 11770-3.

In another embodiment the authentication check further comprises checking if the identification of the second device is compliant with an expected identification. Thereby, it is ensured that the second device really is the device that it should be. The identity could be obtained by checking a certificate stored in the second device.

The invention also relates to a method of determining whether data stored on a first communication device are to be accessed by a second communication device, the method comprising the step of performing a distance measurement between the first and the second communication device and checking whether the measured distance is within a predefined distance interval, wherein the distance measurement is an authenticated distance measurement according to the above. By using the authenticated distance measurement in connection with sharing data between devices, unauthorized distribution of content can be reduced.

In a specific embodiment the data stored on the first device is sent to the second device if it is determined that the data stored on the first device are to be accessed by the second device.

The invention also relates to a method of determining whether data stored on a first communication device are to be accessed by a second communication device, the method comprising the step of performing a distance measurement between a third communication device and the second communication device and checking whether the measured distance is within a predefined distance interval, wherein the distance measurement is an authenticated distance measurement according to the above. In this embodiment, the distance is not measured between the first communication device, on which the data are stored, and the second communication device. Instead, the distance is measured between a third communication device and the second communication device, where the third communication device could be personal to the owner of the content.

The invention also relates to a communication device for performing authenticated distance measurement to a second communication device, where the communication device shares a common secret with the second communication device and where the communication device comprises means for measuring the distance to the second device using the common secret.

In an embodiment, the device comprises:
means for transmitting a first signal to a second communication device at a first time t1, the second communication device being adapted for receiving the first signal, generating a second signal by modifying the received first signal according to the common secret and transmitting the second signal,
means for receiving the second signal at a second time t2,
means for checking if the second signal has been modified according to the common secret, and
means for determining the distance between the first and the second communication device according to a time difference between t1 and t2.

The invention also relates to an apparatus for playing back multimedia content comprising a communication device according to the above.

In the following preferred embodiments of the invention will be described referring to the figures, wherein.

Figure 1:
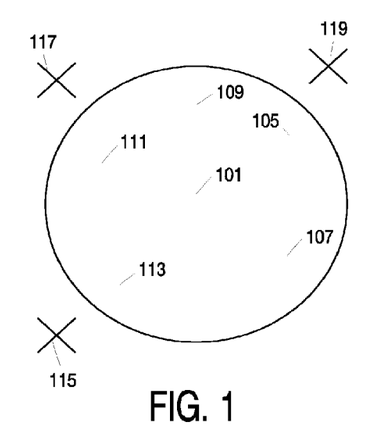
FIG. 1 illustrates authenticated distance measurement being used for content protection.

FIG. 1 illustrates an embodiment wherein the authenticated distance measurement is being used for content protection. In the center of the circle 101 a computer 103 is placed. The computer comprises content, such as data, software, images, multimedia content being video and/or audio, stored on e.g. a hard disk, solid state memory, a DVD or a CD. The owner of the computer 103 owns the content and therefore the computer is authorized to access and present the multimedia content for the user. When the user wants to make a legal copy of the content on another device via e.g. a SAC, the distance between the other device and the computer 103 is measured and only devices within a predefined distance illustrated by the devices 105, 107, 109, 111, 113 inside the circle 101 are allowed to receive the content. Whereas the devices 115, 117, 119 having a distance to the computer 103 being larger than the predefined distance are not allowed to receive the content.

In the example a device is a computer 103, but it could e.g. also be a DVD drive, a CD drive or a Video display device, as long as the device comprises a communication device for performing the distance measurement.

In a specific example, the distance might not be measured between the computer 103, on which the data are stored, and the other device, it could be determined between a third device (e.g. a device being personal to the owner of the content and which does not contain the data) and the other device.

Figure 2:
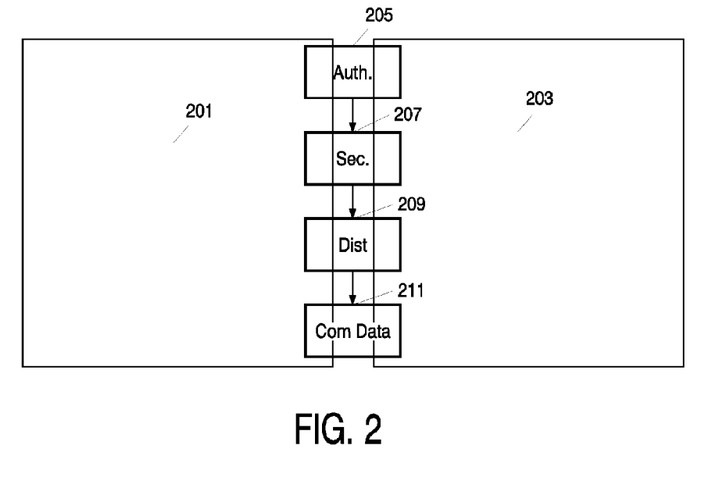
FIG. 2 is a flow diagram illustrating the method of performing authenticated distance measurement.

In FIG. 2 a flow diagram illustrates the general idea of performing authenticated distance measurement between two devices, 201 and 203 each comprising communication devices for performing the authenticated distance measurement. In the example the first device 201 comprises content which the second device 203 has requested. The authenticated distance measurement then is as follows. In step 205 the first device 201 authenticates the second device 203; this could comprise the steps of checking whether the second device 203 is a compliant device and might also comprise the step of checking whether the second device 203 really is the device identified to the first device 201. Then in step 207, the first device 201 exchanges a secret with the second device 203, which e.g. could be performed by transmitting a random generated bit word to the second device 203. The secret should be shared securely, e.g. according to some key management protocol as described in e.g. ISO 11770.

Then in step 209, a signal for distance measurement is transmitted to the second device 203; the second device modifies the received signal according to the secret and retransmits the modified signal back to the first device. The first device 201 measures the round trip time between the signal leaving and the signal returning and checks if the returned signal was modified according to the exchanged secret. The modification of the returned signal according to some secret will most likely be dependent on the transmission system and the signal used for distance measurement, i.e. it will be specific for each communication system (such as 1394, Ethernet, Bluetooth, IEEE 802.11, etc.).

The signal used for the distance measurement may be a normal data bit signal, but also special signals other than for data communication may be used. In an embodiment spread spectrum signals are used to be able to get high resolution and to be able to cope with bad transmission conditions (e.g. wireless environments with a lot of reflections).

In a specific example a direct sequence spread spectrum signal is used for distance measurement; this signal could be modified by XORing the chips (e.g. spreading code consisting of 127 chips) of the direct sequence code by the bits of the secret (e.g. secret consists also of 127 bits). Also, other mathematical operations similar to XOR could be used.

The authentication 205 and exchange of secret 207 could be performed using the protocols described in some known ISO standards e.g. ISO 9798 and ISO 11770. For example the first device 201 could authenticate the second device 203 according to the following communication scenario:
First device->Second device: $R_B \| Text\ 1$
where $R_B$ is a random number
Second device->First device: $CertA \| TokenAB$ Where CertA is a certificate of A
$TokenAB = R_A \| R_B \| B \| Text3 \| sS_A(R_A \| R_B \| B \| Text2)$
$R_A$ is a random number
Indentifier B is an option
$sS_A$ is a signature set by A using private key $S_A$ If TokenAB is replaced with the token as specified in ISO 11770-3 we at the same time can do secret key exchange. We can use this by substituting Text2 by:
$Text2 := eP_B(A \| K \| Text2) \| Text3$
Where $eP_B$ is encrypted with Public key B
A is identifier of A
K is a secret to be exchanged In this case the second device 203 determines the key (i.e. has key control), this is also called a key transport protocol, but also a key agreement protocol could be used. This may be undesirable in which case it can be reversed, such that the first device determines the key. A secret key has now been exchanged according to step 207 in FIG. 2. Again, the secret key could be exchanged by e.g. a key transport protocol or a key agreement protocol.

After the distance has been measured in a secure authenticated way as described above, content data can be sent between the first and the second device in step 211 in FIG. 2.

Figure 3:
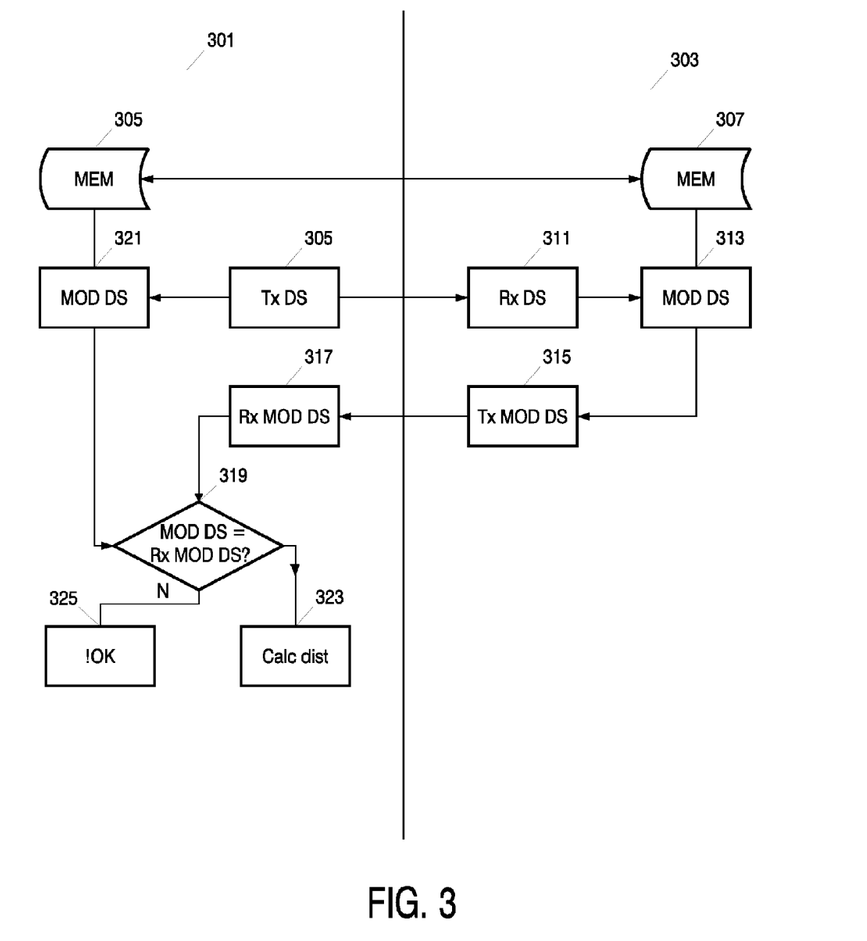
FIG. 3 illustrates in further detail the step of performing the authenticated distance measurement shown in FIG. 2.

FIG. 3 illustrates in further detail, the step of performing the authenticated distance measurement. As described above, the first device 301 and the second device 303 have exchanged a secret; the secret is stored in the memory 305 of the first device and the memory 307 of the second device. In order to perform the distance measurement, a signal is transmitted to the second device via a transmitter 305. The second device receives the signal via a receiver 311, and microprocessor 313 modifies the signal by using the locally stored secret. The signal is modified by the second device according to rules known by the first device 301 and transmitted back to the first device 301 via a transmitter 315. The first device 301 receives the modified signal via a receiver 317 and in 319 the received modified signal is compared to a signal, which has been modified locally i.e. by the first device. The local modification is performed in microprocessor 321 by using the signal transmitted to the second device in transmitter 305 and then modifying the signal using the locally stored secret similar to the modification rules used by the second device. If the received modified signal and the locally modified signal are identical, then the received signal is authenticated and can be used for determining the distance between the first and the second device. If the two signals are not identical, then the received signal cannot be authenticated and can therefore not be used for measuring the distance as illustrated by 325. In microprocessor 323 the distance is calculated between the first and the second device; this could e.g. be performed by measuring the time, when the signal is transmitted by the transmitter 309 from the first device to the second device and measuring when the receiver 317 receives the signal from the second device. The time difference between a transmittal time and a reception time can then be used for determining the physical distance between the first device and the second device.

Figure 4:
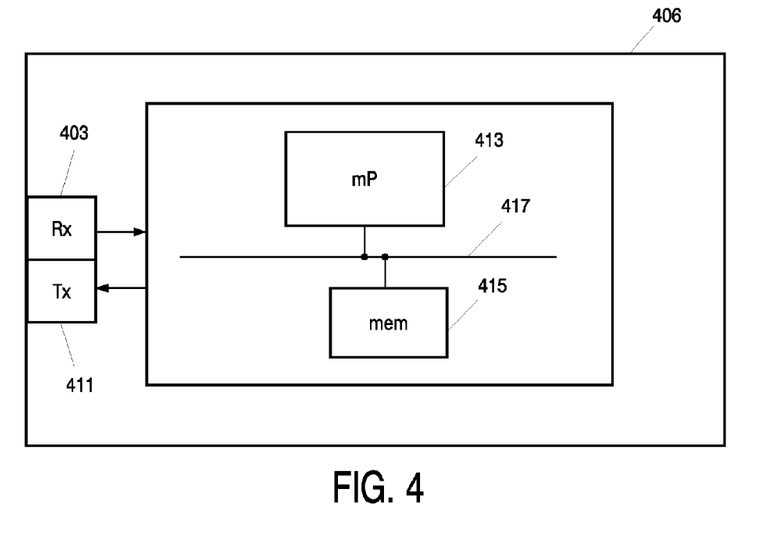
FIG. 4 illustrates a communication device for performing authenticated distance measurement.

In FIG. 4 a communication device for performing authenticated distance measurement is illustrated. The device 406 comprises a receiver 403 and a transmitter 411. The device further comprises means for performing the steps described above, which could be performed by executing software using a microprocessor 413 connected to memory 415 via a communication bus 417. The communication device could then be placed inside devices such as a DVD, a DVD recorder, a computer, a CD, a CD recorder, a solid state memory, a television and other devices for providing protected content, accessing protected content, or authorizing the access to protected content.

What is claimed is:

1. A first device for controlling delivery of protected content to a second device, the first device comprising:
   a memory;
   a processor, said processor arranged to:
      receive a certificate of the second device, the certificate providing information regarding the second device;
      determine whether the second device is compliant with a set of compliance rules utilizing said information provided in said certificate;
      provide a first signal to the second device depending when the second device is determined to be compliant with the set of compliance rules;
      receive a second signal from the second device after providing the first signal;
      determine whether the second signal is derived from a secret known by the first device;
      determine whether a time difference between providing the first signal and receiving the second signal is less than a predetermined time; and
      allow the protected content to be provided to the second device when at least the second signal is determined to be derived from the secret and the time difference is less than the predetermined time.

2. The first device of claim 1, wherein the first signal comprises a random number.

3. The first device of claim 1, wherein the second signal is formed by modifying the first signal based on the secret, wherein the modification comprises performing an XOR operation on the first signal.

4. The first device of claim 1, wherein the processor is further arranged to provide the secret to the second device.

5. The first device of claim 4, wherein the secret is securely provided using one of: a key transport protocol, a key management protocol and a key agreement protocol.

6. The first device of claim 4, wherein the processor arranged to provide the secret to the second device comprises the processor arranged to provide the secret to the second device via encryption by a public key of a private/public key-pair of the second device, if the second device is compliant, said secret comprising a random number.

7. The first device of claim 1, wherein the processor is further arranged to receive the secret from the second device.

8. The first device of claim 7, wherein the secret is securely received using one of: a key transport protocol, a key management protocol and a key agreement protocol.

9. The first device of claim 1, wherein the processor arranged to determine whether the second signal is derived from the secret is arranged to:
   modify the first signal according to the secret;
   compare the modified first signal with the second signal; and
   provide an indication when said modified first signal is identical to the second signal.

10. The first device of claim 1, wherein the first signal and the secret are of comparable length.

11. The first device of claim 1, wherein the processor is further arranged to determine an identity of the second device using the certificate.

12. The first device of claim 1, wherein the certificate comprises a public key.

13. The first device of claim 1, wherein the processor is further arranged to provide a certificate to the second device.

14. The first device of claim 1, wherein the predetermined time is based on a communication system associated with the first device.

15. The first device of claim 1, wherein the second signal comprises the first signal modified by the secret.

16. The first device of claim 1, wherein the processor is further arranged to:
   provide instruction to a third device to transmit said protected content, wherein said protected content is stored on said third device.

17. A system for controlling the transmission of protected content from a content provider to a requesting device, the content provider comprising:
   means for receiving a certificate of the requesting device, the certificate providing information for validating the requesting device as being compliant with a set of compliancy rules;
   means for validating that the requesting device is compliant with the set of compliancy rules using said information contained in said certificate;
   means for transmitting a first signal to the requesting device at a first time when said requesting device is validated as being compliant with the set of compliancy rules;
   means for receiving a second signal at a second time from the requesting device;
   means for providing the protected content to the requesting device after determining the second signal depends on a secret known to the content provider, and
   a time difference between the first time and the second time is less than a predetermined time.

18. The system of claim 17, wherein said protected content is stored on a third device.

19. The system of claim 18, wherein said means for providing the requested content comprises:
   means for providing instruction to said third device to provide said content to said requesting device.

20. The system of claim 18, wherein the third device is one of: a DVD, CD and a storage device.

21. The system of claim 17, wherein the secret is securely received by the content provider.

22. The system of claim 17, wherein the secret is securely transmitted by the content provider.

23. The system of claim 17, wherein the certificate identifies the requesting device.

24. The system of claim 17, wherein the predetermined time is based on a type of communication protocol between the requesting device and the content provider.

25. The system of claim 17, wherein the content provider is one of: a DVD, CD and a storage device.

26. The system of claim 17, wherein the second signal comprises the first signal modified by the secret.

27. A first device in communication with a second device, the first device comprising:
   a memory;
   a processor in communication with the memory, the processor arranged to execute software stored on the first device, the software configured to:
      receive from the second device a request for a protected content and a certificate providing information associated with the second device;
      determine whether the second device is suitable for receiving said protected content, wherein determining suitability of said second device is based on said information provided in said certificate;

provide a first signal to said second device when said second device is determined to be suitable for receiving said protected content;
receive from said second device a second signal;
determine whether said second signal is representative of said first signal modified according to a secret known by said first device and said second device;
determine whether a time difference between a time of providing the first signal and receiving the second signal is less than a predetermined time; and
initiate transmission of said protected content to said second device when at least said second signal is representative of said first signal modified according to a secret known by said first device and said second device and said time difference is less than the predetermined time.

28. The first device of claim 27, wherein said protected content is stored on said first device.

29. The first device of claim 27, wherein the software configured to initiate said initiating transmission of said protected content is further configured to provide instruction to a third device to transmit said protected content, wherein said protected content is stored on said third device.

30. The first device of claim 29, wherein said third device is one of a DVD, a CD and a storage device.

31. The first device of claim 29, wherein said third device is remotely located from said first device.

32. The first device of claim 27, wherein suitability is determined as being compliant with a set of compliancy rules.

33. The first device of claim 27, wherein the software is further arranged to:
provide the secret to the second device via encryption by a public key of a private/public key-pair of the second device, if the second device is suitable, said secret comprising a random number.

34. A method of a first device controlling delivery of protected content to a second device, the method comprising:
receiving a certificate of the second device, the certificate providing information regarding the second device;
determining whether the second device is compliant with a set of compliance rules utilizing said information provided in said certificate;
providing a first signal to the second device depending when the second device is determined to be compliant with the set of compliance rules;
receiving a second signal from the second device after providing the first signal;
determining whether the second signal is derived from a secret known by the first device;
determining whether a time difference between providing the first signal and receiving the second signal is less than a predetermined time; and
allowing the protected content to be provided to the second device when at least the second signal is determined to be derived from the secret and the time difference is less than the predetermined time.

35. The method of claim 34, wherein the first signal comprises a random number.

36. The method of claim 34, wherein the second signal is formed by modifying the first signal based on the secret, wherein the modification comprises performing an XOR operation on the first signal.

37. The method of claim 34, further comprising providing the secret to the second device.

38. The method of claim 37, wherein the secret is securely provided using one of: a key transport protocol, a key management protocol and a key agreement protocol.

39. The method of claim 34, further comprising receiving the secret from the second device.

40. The method of claim 39, wherein the secret is securely received using one of: a key transport protocol, a key management protocol and a key agreement protocol.

41. The method of claim 34, wherein the step of determining whether the second signal is derived from the secret comprises:
modifying the first signal according to the secret;
comparing the modified first signal with the second signal; and
providing an indication when said modified first signal is identical to the second signal.

42. The method of claim 34, wherein the first signal and the secret are of comparable length.

43. The method of claim 34, further comprising determining an identity of the second device using the certificate.

44. The method of claim 34, wherein the certificate comprises a public key.

45. The method of claim 34, further comprising providing a certificate to the second device.

46. The method of claim 34, wherein the predetermined time is based on a communication system associated with the first device.

47. The method of claim 34, wherein the second signal comprises the first signal modified by the secret.

48. The method of claim 34, further comprising providing instruction to a third device to transmit said protected content, wherein said protected content is stored on said third device.

49. A first device for controlling delivery of protected content to a second device, the first device comprising:
a memory;
a processor, the processor arranged to:
receive a certificate from the second device prior to sending a first signal;
determine from the certificate if the second device is compliant;
provide a secret to the second device via encryption by a public key of a private/public key-pair of the second device, if the second device is compliant, said secret comprising a random number;
provide the first signal to the second device;
receive a second signal from the second device after providing the first signal;
determine if the second signal is derived from the secret by determining whether the second signal is the first signal modified based on the secret;
determine whether a time difference between providing the first signal and receiving the second signal is less than a predetermined time; and
allow the protected content to be provided to the second device at least when the second signal is determined to be derived from the secret and the time difference is less than the predetermined time.

50. The first device of claim 49, wherein the processor is further arranged to:
use the secret to generate a secure authenticated channel between the first device and the second device,
use the secure authenticated channel to provide the protected content to the second device.

51. The first device of claim 49, wherein the secret and the first signal are of comparable length.

52. The first device of claim 49, wherein the modification is a XOR operation using the first signal.

53. The first device of claim 49, wherein the processor, arranged to determine that the second signal is derived from the secret, is further arranged to:
  modify the first signal according to the secret;
  compare the modified first signal with the second signal; and
  determine that the modified first signal is identical to the second signal.

54. The first device of claim 49, wherein the first signal comprises a random number.

55. A method of a first device controlling delivery of protected content to a second device, the method comprising:
  receiving a certificate from the second device prior to sending a first signal;
  determining from the certificate if the second device is compliant;
  providing a secret to the second device via encryption by a public key of a private/public key-pair of the second device, if the second device is compliant, said secret comprising a random number;
  providing the first signal to the second device;
  receiving a second signal from the second device after providing the first signal;
    determining if the second signal is derived from the secret by determining whether the second signal is the first signal modified based on the secret;
    determining whether a time difference between providing the first signal and receiving the second signal is less than a predetermined time; and
  allowing the protected content to be provided to the second device at least when the second signal is determined to be derived from the secret and the time difference is less than the predetermined time.

56. The method of claim 55, further comprising:
  using the secret to generate a secure authenticated channel between the first device and the second device,
  using the secure authenticated channel to provide the protected content to the second device.

57. The method of claim 55, wherein the secret and the first signal have the same bit length.

58. The method of claim 55, wherein the modification is a XOR operation using the first signal.

59. The method of claim 55, wherein the step of determining that the second signal is derived from the secret comprises:
  modifying the first signal according to the secret;
  comparing the modified first signal with the second signal; and
  determining that the modified first signal is identical to the second signal.

60. The method of claim 55, wherein the first signal comprises a random number.

* * * * *

(12) INTER PARTES REVIEW CERTIFICATE (3606th)
United States Patent
Kamperman (10) Number: US 9,436,809 K1
(45) Certificate Issued: Jun. 10, 2024

(54) SECURE AUTHENTICATED DISTANCE MEASUREMENT (71) Applicant: Franciscus Lucas Antonius Johannes Kamperman (72) Inventor: Franciscus Lucas Antonius Johannes Kamperman (73) Assignee: KONINKLIJKE PHILIPS N.V.

Trial Numbers:

IPR2021-00327 filed Dec. 31, 2020
IPR2021-00370 filed Jan. 4, 2021

Inter Partes Review Certificate for:

Patent No.: 9,436,809
Issued: Sep. 6, 2016
Appl. No.: 14/538,493
Filed: Nov. 11, 2014

The results of IPR2021-00327; IPR2021-00370 are reflected in this inter partes review certificate under 35 U.S.C. 318(b).

INTER PARTES REVIEW CERTIFICATE
U.S. Patent 9,436,809 K1
Trial No. IPR2021-00327
Certificate Issued Jun. 10, 2024

AS A RESULT OF THE INTER PARTES REVIEW PROCEEDING, IT HAS BEEN DETERMINED THAT:

Claims 1-6, 9-15 and 49-54 are found patentable.

\* \* \* \* \*